United States Patent
Elmaleh et al.

(10) Patent No.: US 12,332,720 B2
(45) Date of Patent: Jun. 17, 2025

(54) LOW POWER OPTIMIZATION BASED UPON HOST EXIT LATENCY

(71) Applicant: Western Digital Technologies, Inc., San Jose, CA (US)

(72) Inventors: Nissim Elmaleh, Meitar (IL); Amir Segev, Meiter (IL); Shay Benisty, Beer Sheva (IL)

(73) Assignee: Sandisk Technologies, Inc., Milpitas, CA (US)

( * ) Notice: Subject to any disclaimer, the term of this patent is extended or adjusted under 35 U.S.C. 154(b) by 61 days.

(21) Appl. No.: 18/218,864

(22) Filed: Jul. 6, 2023

(65) Prior Publication Data

US 2024/0319779 A1    Sep. 26, 2024

Related U.S. Application Data

(60) Provisional application No. 63/453,288, filed on Mar. 20, 2023.

(51) Int. Cl.
*G06F 1/32* (2019.01)
*G06F 1/3234* (2019.01)
*G06F 1/3296* (2019.01)

(52) U.S. Cl.
CPC .......... *G06F 1/3268* (2013.01); *G06F 1/3296* (2013.01)

(58) Field of Classification Search
CPC .................................. G06F 1/32; G06F 9/44
See application file for complete search history.

(56) References Cited

U.S. PATENT DOCUMENTS

| 5,650,762 | A  | * | 7/1997 | Takahashi | G08B 17/00 |
|||||||340/505|
| 9,116,694 | B2 | | 8/2015 | Ooi | |
| 9,417,961 | B2 | | 8/2016 | Dash et al. | |
| 10,732,871 | B2 | | 8/2020 | Benisty et al. | |
| 2011/0154090 | A1 | * | 6/2011 | Dixon | G06F 11/1658 |
|||||||713/502|

(Continued)

FOREIGN PATENT DOCUMENTS

CN        111142653 A     5/2020

OTHER PUBLICATIONS

International Search Report and Written Opinion for Application No. PCT/US2024/011408 dated May 17, 2024.

*Primary Examiner* — Keshab R Pandey
(74) *Attorney, Agent, or Firm* — PATTERSON + SHERIDAN, LLP

(57) ABSTRACT

There is a tradeoff between the amount of power consumption decreased and the latency needed to return a data storage device back to an operational power mode. When the data storage device receives a wake up indication from a host device, a controller of the data storage device initiates a counter in order to determine a host exit latency. Based on the host exit latency, the controller determines a group of low power state entrance actions from a plurality of groups to perform during a next entrance into a firmware active idle state based on an associated completion wake up time and the host exit latency. The controller selects the group whose completion wake up time is closest to the host exit latency and less than or equal to the host exit latency. The controller performs the selected groups low power state entrance actions during a next entrance into the firmware active idle state.

20 Claims, 9 Drawing Sheets

(56) References Cited

U.S. PATENT DOCUMENTS

| | | | |
|---|---|---|---|
| 2012/0096293 A1* | 4/2012 | Floyd | G06F 1/3287 713/323 |
| 2013/0290606 A1 | 10/2013 | Alessi et al. | |
| 2017/0168853 A1 | 6/2017 | Nampoothiri et al. | |
| 2019/0086995 A1 | 3/2019 | Koyama et al. | |
| 2019/0235612 A1 | 8/2019 | Li et al. | |
| 2021/0018975 A1 | 1/2021 | Liang et al. | |
| 2022/0326885 A1 | 10/2022 | Jeon et al. | |
| 2022/0327074 A1 | 10/2022 | Jeon et al. | |

\* cited by examiner

LOW POWER OPTIMIZATION BASED UPON HOST EXIT LATENCY

CROSS-REFERENCE TO RELATED APPLICATIONS

This application claims benefit of U.S. Provisional Patent Application Ser. No. 63/453,288, filed Mar. 20, 2023, which is herein incorporated by reference.

BACKGROUND OF THE DISCLOSURE

Field of the Disclosure

Embodiments of the present disclosure generally relate to data storage devices, such as solid state drives (SSDs), and, more specifically, optimizing device-exit-latency of the data storage device.

Description of the Related Art

When a data storage device has no commands to perform and/or when there are no input/output (I/O) related activities over a peripheral component interconnect (PCI) express (PCIe) coupling the data storage device to a host device, the data storage device may be transitioned to a firmware (FW) active idle state. When the data storage device is in the FW active idle state, the data storage device may attempt to reduce its power consumption, such as by turning off one or more clocks, turning off certain components of the data storage device, or transitioning the PCIe link into a low power state (e.g., L1.2), which may effectively place the data storage device in a low power state. When the PCIe link is placed in the low power state, the data storage device will also send a long term retention (LTR) notification to the host device indicating a new latency requirement associated with the power state transition.

In order to wake up the data storage device from the low power state, the host device sends a wake up indication to the data storage device. The time it takes for the host device to pull the data storage device out of the low power mode (i.e., when the host device sends a doorbell associated with a command) is the host exit latency. When the host device sends a command to the data storage device, the data storage device may still be initializing or restoring one or more clocks, components, and the like that were turned off in order to reduce power consumption. Thus, completing the command sent by the host device may be delayed, which may result in a lower quality of service (QOS) provided by the data storage device.

Therefore, there is a need in the art for an improved low power state entrance when the data storage device is transitioned to the FW active idle state.

SUMMARY OF THE DISCLOSURE

The present disclosure generally relates to data storage devices, such as solid state drives (SSDs), and, more specifically, optimizing device-exit-latency of the data storage device. There is a tradeoff between the amount of power consumption decreased and the latency needed to return a data storage device back to an operational power mode. When the data storage device receives a wake up indication from a host device, a controller of the data storage device initiates a counter in order to determine a host exit latency. Based on the host exit latency, the controller determines a group of low power state entrance actions from a plurality of groups to perform during a next entrance into a firmware active idle state based on an associated completion wake up time and the host exit latency. The controller selects the group whose completion wake up time is closest to the host exit latency and less than or equal to the host exit latency. The controller performs the selected groups low power state entrance actions during a next entrance into the firmware active idle state.

In one embodiment, a data storage device includes a memory device and a controller coupled to the memory device. The controller is configured to receive a wake up indication from a host device, where the data storage device is in a low power state, receive a doorbell from the host device indicating that a new command is in a submission queue of the host device, determine a host exit latency, where the host exit latency is a time between the wake up indication and the doorbell, and utilize the host exit latency to select a group of actions from a plurality of group of actions based on the determining, where each of the plurality of group of actions comprises a different amount of low power state entrance actions to complete during a next low power state entrance.

In another embodiment, a data storage device includes a memory device and a controller coupled to the memory device. The controller includes a firmware-active detector and a latency program selector coupled to the firmware-active detector. The firmware-active detector is configured to determine a host exit latency, where the host exit latency is a time between receiving a wake up indication from a host device and receiving a doorbell subsequent to receiving the wake up indication from the host device. The latency program selector is configured to select a group of actions from a plurality of group of actions based on the determining, where each of the plurality of group of actions comprises a different amount of low power state entrance actions to complete during a next low power state entrance.

In another embodiment, a data storage device includes a means for storing data and a controller coupled to the means for storing data. The controller is configured to determine that an idle time timeout threshold has been reached, perform a number of low power state entrance actions based on a previously determined host exit latency, where a completion wake up time to complete the number of low power state entrance actions is less than the previously determined host exit latency, and transition the data storage device into a low power mode.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

In the following, reference is made to embodiments of the disclosure. However, it should be understood that the disclosure is not limited to specifically described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments, and advantages are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in a claim(s).

Figure 1:
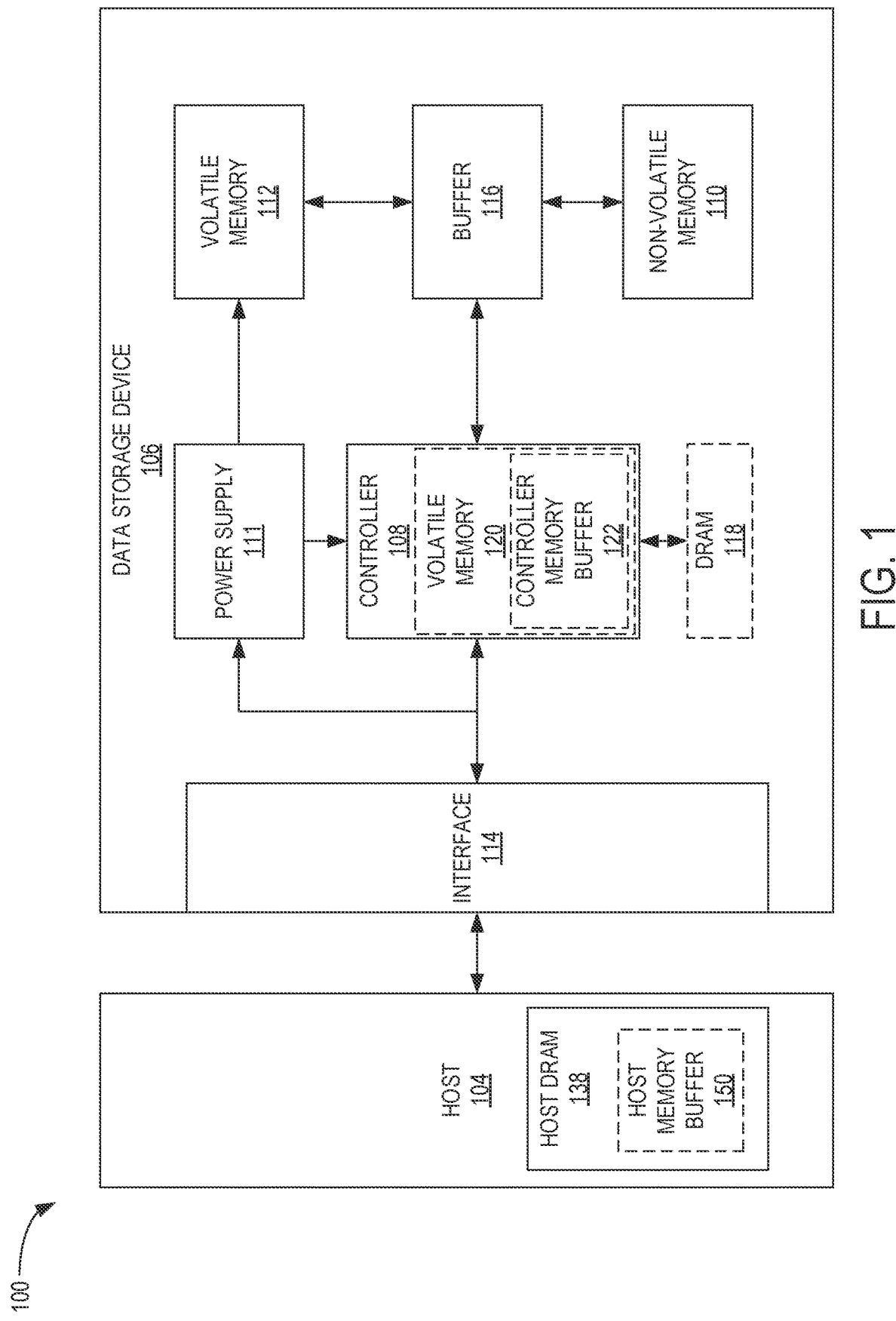
FIG. 1 is a schematic block diagram illustrating a storage system in which a data storage device may function as a storage device for a host device, according to certain embodiments.

The present disclosure generally relates to data storage devices, such as solid state drives (SSDs), and, more specifically, optimizing device-exit-latency of the data storage device. There is a tradeoff between the amount of power consumption decreased and the latency needed to return a data storage device back to an operational power mode. When the data storage device receives a wake up indication from a host device, a controller of the data storage device initiates a counter in order to determine a host exit latency. Based on the host exit latency, the controller determines a group of low power state entrance actions from a plurality of groups to perform during a next entrance into a firmware active idle state based on an associated completion wake up time and the host exit latency. The controller selects the group whose completion wake up time is closest to the host exit latency and less than or equal to the host exit latency. The controller performs the selected groups low power state entrance actions during a next entrance into the firmware active idle state FIG. 1 is a schematic block diagram illustrating a storage system 100 having a data storage device 106 that may function as a storage device for a host device 104, according to certain embodiments. For instance, the host device 104 may utilize a non-volatile memory (NVM) 110 included in data storage device 106 to store and retrieve data. The host device 104 comprises a host DRAM 138. In some examples, the storage system 100 may include a plurality of storage devices, such as the data storage device 106, which may operate as a storage array. For instance, the storage system 100 may include a plurality of data storage devices 106 configured as a redundant array of inexpensive/independent disks (RAID) that collectively function as a mass storage device for the host device 104.

The host device 104 may store and/or retrieve data to and/or from one or more storage devices, such as the data storage device 106. As illustrated in FIG. 1, the host device 104 may communicate with the data storage device 106 via an interface 114. The host device 104 may comprise any of a wide range of devices, including computer servers, network-attached storage (NAS) units, desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or other devices capable of sending or receiving data from a data storage device.

The host DRAM 138 may optionally include a host memory buffer (HMB) 150. The HMB 150 is a portion of the host DRAM 138 that is allocated to the data storage device 106 for exclusive use by a controller 108 of the data storage device 106. For example, the controller 108 may store mapping data, buffered commands, logical to physical (L2P) tables, metadata, and the like in the HMB 150. In other words, the HMB 150 may be used by the controller 108 to store data that would normally be stored in a volatile memory 112, a buffer 116, an internal memory of the controller 108, such as static random access memory (SRAM), and the like. In examples where the data storage device 106 does not include a DRAM (i.e., optional DRAM 118), the controller 108 may utilize the HMB 150 as the DRAM of the data storage device 106.

The data storage device 106 includes the controller 108, NVM 110, a power supply 111, volatile memory 112, the interface 114, a write buffer 116, and an optional DRAM 118. In some examples, the data storage device 106 may include additional components not shown in FIG. 1 for the sake of clarity. For example, the data storage device 106 may include a printed circuit board (PCB) to which components of the data storage device 106 are mechanically attached and which includes electrically conductive traces that electrically interconnect components of the data storage device 106 or the like. In some examples, the physical dimensions and connector configurations of the data storage device 106 may conform to one or more standard form factors. Some example standard form factors include, but are not limited to, 3.5" data storage device (e.g., an HDD or SSD), 2.5" data storage device, 1.8" data storage device, peripheral component interconnect (PCI), PCI-extended (PCI-X), PCI Express (PCIe) (e.g., PCIe x1, x4, x8, x16, PCIe Mini Card, MiniPCI, etc.). In some examples, the data storage device 106 may be directly coupled (e.g., directly soldered or plugged into a connector) to a motherboard of the host device 104.

Interface 114 may include one or both of a data bus for exchanging data with the host device 104 and a control bus for exchanging commands with the host device 104. Interface 114 may operate in accordance with any suitable protocol. For example, the interface 114 may operate in accordance with one or more of the following protocols: advanced technology attachment (ATA) (e.g., serial-ATA (SATA) and parallel-ATA (PATA)), Fibre Channel Protocol (FCP), small computer system interface (SCSI), serially attached SCSI (SAS), PCI, and PCIe, non-volatile memory express (NVMe), OpenCAPI, GenZ, Cache Coherent Interface Accelerator (CCIX), Open Channel SSD (OCSSD), or the like. Interface 114 (e.g., the data bus, the control bus, or both) is electrically connected to the controller 108, providing an electrical connection between the host device 104 and the controller 108, allowing data to be exchanged between the host device 104 and the controller 108. In some examples, the electrical connection of interface 114 may also permit the data storage device 106 to receive power from the host device 104. For example, as illustrated in FIG. 1, the power supply 111 may receive power from the host device 104 via interface 114.

The NVM 110 may include a plurality of memory devices or memory units. NVM 110 may be configured to store and/or retrieve data. For instance, a memory unit of NVM 110 may receive data and a message from controller 108 that instructs the memory unit to store the data. Similarly, the memory unit may receive a message from controller 108 that instructs the memory unit to retrieve data. In some examples, each of the memory units may be referred to as a die. In some examples, the NVM 110 may include a plurality of dies (i.e., a plurality of memory units). In some examples, each memory unit may be configured to store relatively large amounts of data (e.g., 128 MB, 256 MB, 512 MB, 1 GB, 2 GB, 4 GB, 8 GB, 16 GB, 32 GB, 64 GB, 128 GB, 256 GB, 512 GB, 1 TB, etc.).

In some examples, each memory unit may include any type of non-volatile memory devices, such as flash memory devices, phase-change memory (PCM) devices, resistive random-access memory (ReRAM) devices, magneto-resistive random-access memory (MRAM) devices, ferroelectric random-access memory (F-RAM), holographic memory devices, and any other type of non-volatile memory devices.

The NVM 110 may comprise a plurality of flash memory devices or memory units. NVM Flash memory devices may include NAND or NOR-based flash memory devices and may store data based on a charge contained in a floating gate of a transistor for each flash memory cell. In NVM flash memory devices, the flash memory device may be divided into a plurality of dies, where each die of the plurality of dies includes a plurality of physical or logical blocks, which may be further divided into a plurality of pages. Each block of the plurality of blocks within a particular memory device may include a plurality of NVM cells. Rows of NVM cells may be electrically connected using a word line to define a page of a plurality of pages. Respective cells in each of the plurality of pages may be electrically connected to respective bit lines. Furthermore, NVM flash memory devices may be 2D or 3D devices and may be single level cell (SLC), multi-level cell (MLC), triple level cell (TLC), or quad level cell (QLC). The controller 108 may write data to and read data from NVM flash memory devices at the page level and erase data from NVM flash memory devices at the block level.

The power supply 111 may provide power to one or more components of the data storage device 106. When operating in a standard mode, the power supply 111 may provide power to one or more components using power provided by an external device, such as the host device 104. For instance, the power supply 111 may provide power to the one or more components using power received from the host device 104 via interface 114. In some examples, the power supply 111 may include one or more power storage components configured to provide power to the one or more components when operating in a shutdown mode, such as where power ceases to be received from the external device. In this way, the power supply 111 may function as an onboard backup power source. Some examples of the one or more power storage components include, but are not limited to, capacitors, super-capacitors, batteries, and the like. In some examples, the amount of power that may be stored by the one or more power storage components may be a function of the cost and/or the size (e.g., area/volume) of the one or more power storage components. In other words, as the amount of power stored by the one or more power storage components increases, the cost and/or the size of the one or more power storage components also increases.

The volatile memory 112 may be used by controller 108 to store information. Volatile memory 112 may include one or more volatile memory devices. In some examples, controller 108 may use volatile memory 112 as a cache. For instance, controller 108 may store cached information in volatile memory 112 until the cached information is written to the NVM 110. As illustrated in FIG. 1, volatile memory 112 may consume power received from the power supply 111. Examples of volatile memory 112 include, but are not limited to, random-access memory (RAM), dynamic random access memory (DRAM), static RAM (SRAM), and synchronous dynamic RAM (SDRAM (e.g., DDR1, DDR2, DDR3, DDR3L, LPDDR3, DDR4, LPDDR4, and the like)). Likewise, the optional DRAM 118 may be utilized to store mapping data, buffered commands, logical to physical (L2P) tables, metadata, cached data, and the like in the optional DRAM 118. In some examples, the data storage device 106 does not include the optional DRAM 118, such that the data storage device 106 is DRAM-less. In other examples, the data storage device 106 includes the optional DRAM 118.

Controller 108 may manage one or more operations of the data storage device 106. For instance, controller 108 may manage the reading of data from and/or the writing of data to the NVM 110. In some embodiments, when the data storage device 106 receives a write command from the host device 104, the controller 108 may initiate a data storage command to store data to the NVM 110 and monitor the progress of the data storage command. Controller 108 may determine at least one operational characteristic of the storage system 100 and store at least one operational characteristic in the NVM 110. In some embodiments, when the data storage device 106 receives a write command from the host device 104, the controller 108 temporarily stores the data associated with the write command in the internal memory or write buffer 116 before sending the data to the NVM 110.

The controller 108 may include an optional second volatile memory 120. The optional second volatile memory 120 may be similar to the volatile memory 112. For example, the optional second volatile memory 120 may be SRAM. The controller 108 may allocate a portion of the optional second volatile memory to the host device 104 as controller memory buffer (CMB) 122. The CMB 122 may be accessed directly by the host device 104. For example, rather than maintaining one or more submission queues in the host device 104, the host device 104 may utilize the CMB 122 to store the one or more submission queues normally maintained in the host device 104. In other words, the host device 104 may generate commands and store the generated commands, with or without the associated data, in the CMB 122, where the controller 108 accesses the CMB 122 in order to retrieve the stored generated commands and/or associated data.

Figure 2:
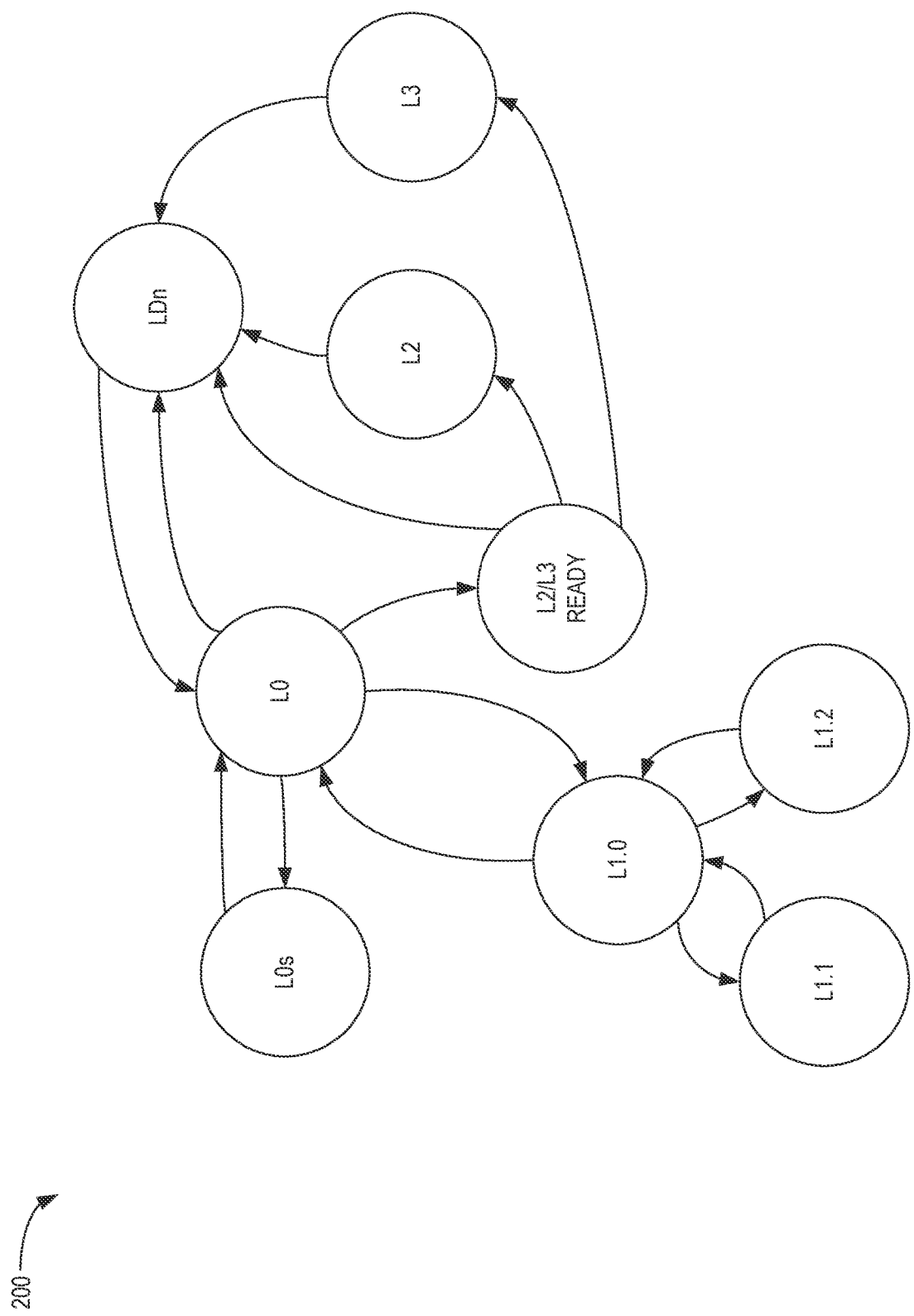
FIG. 2 is an illustration of a link power management flow diagram, according to certain embodiments.

FIG. 2 is an illustration of a link state flow diagram 200, according to certain embodiments. Aspects of the storage system 100 may be referenced in the description herein for exemplary purposes. The data storage device 106 includes several link states. For example, the data storage device 106 may have the following 5 link states: L0, L0s, L1, L2, and L3, where L1 includes a L1.1 sub-state and a L1.2 sub-state. Each of the link states are associated with a distinct operation of the data storage device 106. Link states L0, L0s, and L1 are considered operational link states and utilize a first range of power, whereas link states L2 and L3 are considered non-operational link states, utilizing a second range of power, where the first range of power is greater than the second range of power.

An operational link state refers to the ability of the host device 104 to communicate with the NVM 110 of the data storage device 106. A non-operational link state refers to the inability of the host device 104 to communicate with the NVM 110 of the data storage device 106 due to a shut down or disconnection of a link between the host device 104 and the controller 108. The listed non-operational link states are not intended to be limiting and may include other link states, such as the L1.1 and L1.2 link states. Furthermore, it is contemplated that more or less link states than the number of link states shown in the link state flow diagram 200 may be available and more or less low power link states may be applicable to the embodiments described herein.

Link states are numbered sequentially, where higher numbers represent lower power requirements due to a greater number of offline circuits and corresponding higher exit latencies. Furthermore, each link state has an associated power requirement and an exit latency. L0 and L0s may require 4.5 W with the lowest exit latency. L1 may require less power than L0, such as 3 W, and may have an exit latency equal to or higher than the exit latency of L0. L2 may require less power than L1 and may have an exit latency equal to or higher than the exit latency of L1. L3 may require less power than L2 and may have an exit latency equal to or higher than the exit latency of L2. The values for the link states and exit latencies are not intended to be limiting, but to provide an example of possible embodiments.

L0 is referred to as a fully operational state, where I/O commands are enabled, and the device may generate interrupts. L0 is a link state where the link is operating normally. Interrupts are an automatic transfer of firmware execution due to a system timer or a user command. Link states L0s and L1 are also operational states; however, L0s and L1 may have a lower functionality than that of L0. For example, L0s has a similar power requirement as that of the L0, but only allows for a serial link in one direction. In the L0s link state, data may be transferred in one direction, but not the other. Thus, when a first device is coupled to a second device through a link, the first device may idle a transmitter of the first device independently and separately of the second device idling a transmitter of the second device, and/or vice-versa.

However, L1 allows for a bidirectional serial link and allows for a greater reduction in the power requirement, but has a higher exit latency than that of L0 and L0s. In the L1 link state, no data is being transferred so key portions of the PCIe transceiver logic may be turned off. Link states L2 and L3 are non-operational link states have a power requirement less than that of the operational link states. The difference between the L2 link state and the L3 link state is that power has not been yet removed from the L2 link state. Furthermore, the memory devices of the NVM 110 that are not used are placed in a non-operational link state, L2 and L3, to limit the idle power consumption to a minimal value.

In order for I/O commands to occur, the link, such as a data bus, between the host device 104 and the controller 108 is woken up and placed into the L0 link state. The controller 108 changes the link state of the link between the host device 104 and the controller 108 from the operational link states, such as L0, L0s, or L1, to a different operational link state, such as L0, L0s, or L1, or to a non-operational link state, such as L2 or L3, depending on the situation. However, in order for the link to be placed into L2 or L3, the link will need to be in link state L2/L3 ready, which is a pseudo-state to prepare the component for a loss in power and reference clock(s). The controller 108 allocates the appropriate amount of power to return all link states L0s, L1, L2, L3 into link state L0 when a full operational state is required. For example, to return to L0 from L2 or L3, the link transitions to a transient pseudo-state, LDn, before transitioning to L0. The LDn state may be a fundamental reset state, a hot reset state, or a link disable transmission state by the upstream component (e.g., the host device 104).

The link state L1, in some embodiments, includes additional sub-states, L1.1 and L1.2, where the link state L1 may be referred to as L1.0. The L1 sub-states (L1SS), L1.1 and L1.2, may require more power for operation than L2 and L3; however, the L1SS utilizes less power than the L1.0 state. At an L1SS, the link remains operational and requires less power to return to a more operational state, such as L1.0 or L0. Furthermore, the L1SS requires less time than the L2 and/or the L3 link states to return to a full active link state L0. It is to be understood that "link state" may be referred to as "power state" herein for exemplary purposes.

Figure 3:
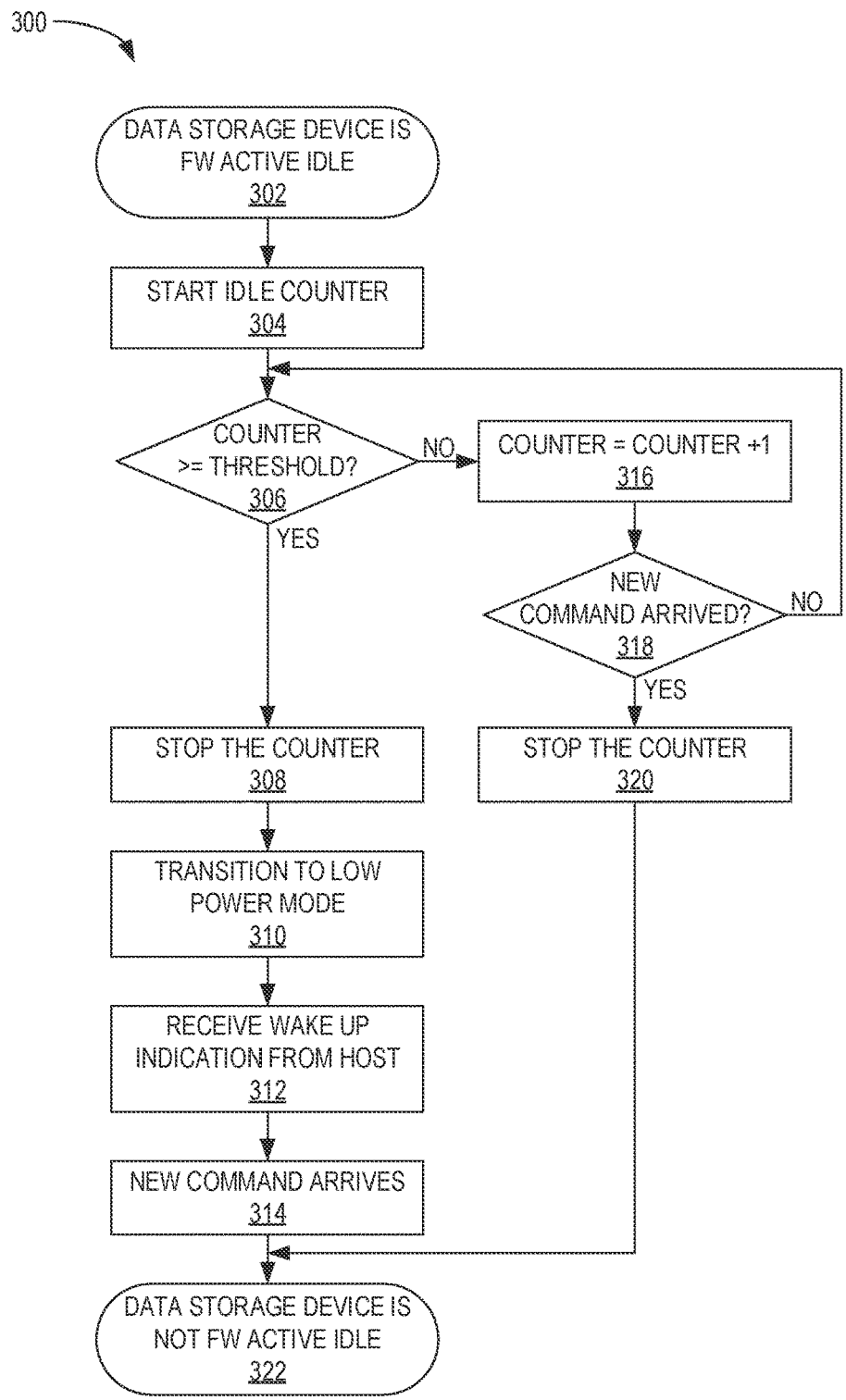
FIG. 3 is a flow diagram illustrating a method of FW active idle power flow, according to certain embodiments.

FIG. 3 is a flow diagram illustrating a method 300 of FW active idle power flow, according to certain embodiments. Method 300 may be executed by a controller, such as the controller 108 of FIG. 1. For exemplary purposes, aspects of the storage system 100 of FIG. 1 may be referenced herein.

At block 302, the data storage device is in a FW active idle state. At block 304, the controller 108 starts an idle counter. The idle counter may be referred to as a "counter" herein for simplification purposes. The idle counter may be a generic or dedicated counter of a timer of the controller 108. Furthermore, starting the idle counter. At block 306, the controller determines if the counter is greater than or equal to an idle time timeout threshold, where the idle time timeout threshold is a maximum time before the controller 108 transitions the data storage device 106 into a low power mode. If the counter is greater than or equal to the idle time timeout threshold at block 306, then the controller 108 stops the counter at block 308.

At block 310, the controller 108 transitions the data storage device 106 into a low power mode. The transitioning may include one or more of powering down one or more hardware modules of the data storage device 106 while retaining memories, powering down one or more hardware modules of the data storage device 106 without retaining memories, turning off one or more clocks, turning off one or more phase lock loops (PLLs), and the like. It is to be understood that the examples described above are not intended to be limiting, but to provide examples of possible embodiments. In other words, at block 310, the controller 108 transitions may transition the data storage device 106 to the L1.2 link state as described in FIG. 2. Transitioning to the low power mode may also include notifying the host device 104, by the controller 108, that the data storage device 106 is entering the low power mode.

At block 312, the controller 108 receives a wake up indication from the host device 104 to return form the low power state (e.g., L1.2) to an operational power state (e.g., L0, L0s, or L1). For example, when the controller 108 receives the wake up indication, the controller 108 may restore each of the one or more hardware modules, each of the one or more PLLs, each of the one or more clocks, and/or the like that were turned off or powered down during the previous low power state entrance. Likewise, the controller 108 may restore any tables stored in the volatile memories that were flushed to the non-volatile memory during the previous low power state entrance. At block 314, a new command arrives at the controller 108. For example, the host device 104 may send a doorbell to the controller 108 indicating that a command has been placed in a submission queue of the host device 104 to be fetched by the controller 108. At block 322, the data storage device 108 has been restored to an operational power state and is no longer FW active idle.

However, if the counter is not greater than or equal to the idle time timeout threshold at block 306, then the counter increments by 1 at block 316. It is to be understood that the incremental value is not intended to be limiting, but to provide an example of a possible embodiment. At block 318, the controller 108 determines if a new command has arrived. If a new command has not arrived at block 318, then method 300 returns to block 306. However, if a new command has arrived at block 318, then the controller 108 stops the counter at block 320. At block 322, the data storage device 106 is no longer FW active idle due to receiving the new command at block 318.

Figure 4:
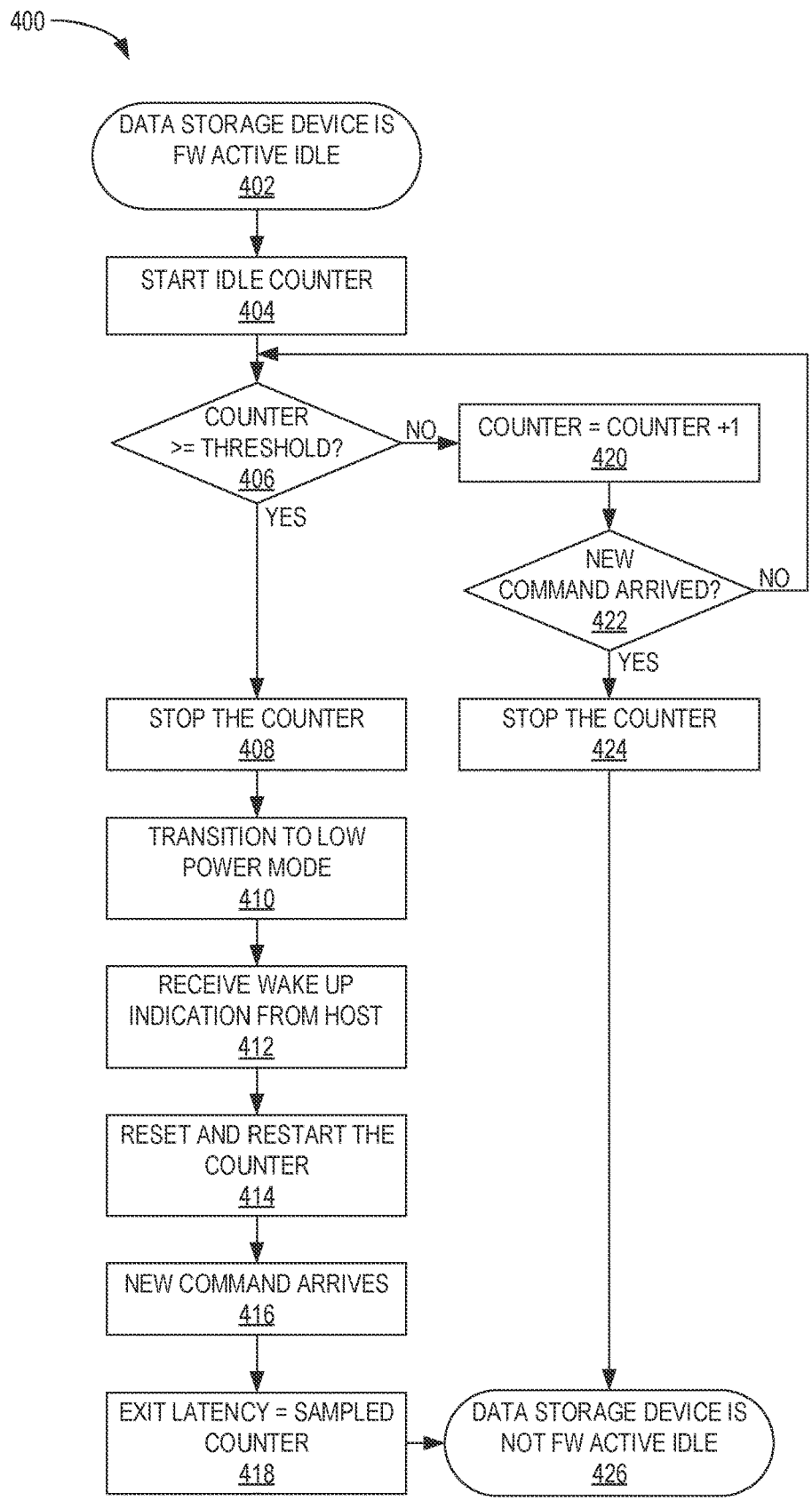
FIG. 4 is a flow diagram illustrating a method of measuring host exit latency, according to certain embodiments.

FIG. 4 is a flow diagram illustrating a method 400 of measuring host exit latency, according to certain embodiments. Method 400 may be executed by a controller, such as the controller 108 of FIG. 1. For exemplary purposes, aspects of the storage system 100 of FIG. 1 may be referenced herein. Method 400 may be similar to method 300, however, method 400 additionally measures a host exit latency.

At block 402, the data storage device is in a FW active idle state. At block 404, the controller 108 starts a counter. The idle counter may be referred to as a "counter" herein for simplification purposes. The idle counter may be a generic or dedicated counter of a timer of the controller 108. Furthermore, starting the counter may include resetting the counter to a value of zero. At block 406, the controller determines if the counter is greater than or equal to an idle time timeout threshold, where the idle time timeout threshold is a maximum time before the controller 108 transitions the data storage device 106 into a low power mode. If the counter is greater than or equal to the idle time timeout threshold at block 406, then the controller 108 stops the counter at block 408.

At block 410, the controller 108 transitions the data storage device 106 into a low power mode. The transitioning may include one or more of powering down one or more hardware modules of the data storage device 106 while retaining memories, powering down one or more hardware modules of the data storage device 106 without retaining memories, turning off one or more clocks, turning off one or more phase lock loops (PLLs), and the like. It is to be understood that the examples described above are not intended to be limiting, but to provide examples of possible embodiments. In other words, at block 410, the controller 108 transitions may transition the data storage device 106 to the L1.2 link state as described in FIG. 2. Transitioning to the low power mode may also include notifying the host device 104, by the controller 108, that the data storage device 106 is entering the low power mode.

At block 412, the controller 108 receives a wake up indication from the host device 104 to return form the low power state (e.g., L1.2) to an operational power state (e.g., L0, L0s, or L1). For example, when the controller 108 receives the wake up indication, the controller 108 may restore each of the one or more hardware modules, each of the one or more PLLs, each of the one or more clocks, and/or the like that were turned off or powered down during the previous low power state entrance. Likewise, the controller 108 may restore any tables stored in the volatile memories that were flushed to the non-volatile memory during the previous low power state entrance.

At block 414, the controller 108 resets and restarts the counter in order to determine a host exit latency. The host exit latency is a time elapsed between the wake up indication and receiving a new command (or doorbell, in some examples). At block 416, a new command arrives at the controller 108. For example, the host device 104 may send a doorbell to the controller 108 indicating that a command has been placed in a submission queue of the host device 104 to be fetched by the controller 108. At block 418, the controller 108 determines the host exit latency, which is equal to the counter sampled when the new command arrived at blocked 416. In some examples, the host exit latency for a specific host/data storage device/connection pairing may be constant or about constant, where "about" refers to a range of +/−5%. In other words, the host exit latency for the pairing may be considered as a constant. At block 426, the data storage device 108 has been restored to an operational power state and is no longer FW active idle.

However, if the counter is not greater than or equal to the idle time timeout threshold at block 406, then the counter increments by 1 at block 420. It is to be understood that the incremental value is not intended to be limiting, but to provide an example of a possible embodiment. At block 422, the controller 108 determines if a new command has arrived. If a new command has not arrived at block 422, then method 400 returns to block 406. However, if a new command has arrived at block 422, then the controller 108 stops the counter at block 424. At block 426, the data storage device 106 is no longer FW active idle due to receiving the new command at block 422.

Figure 5:
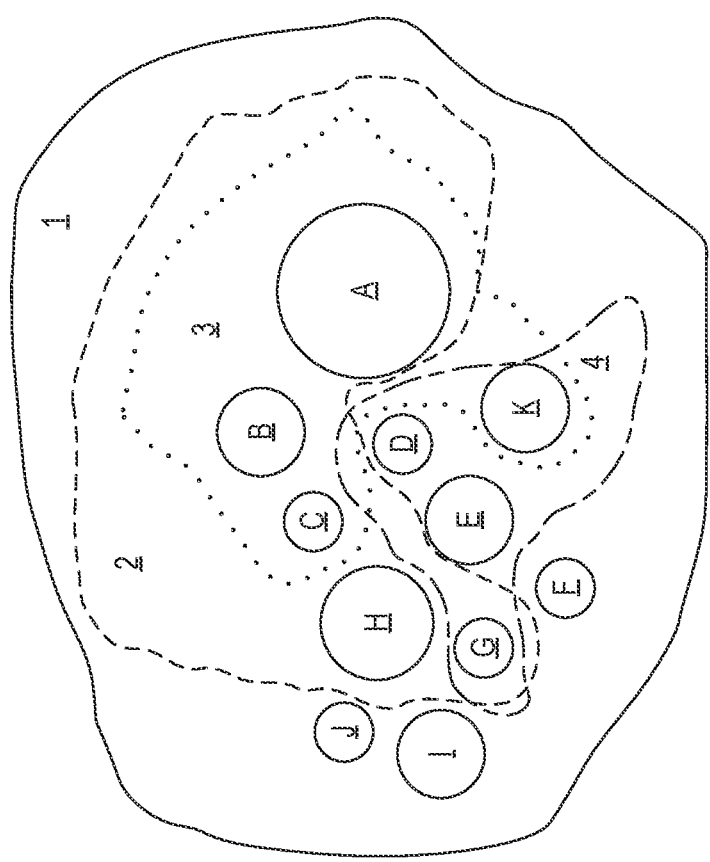
FIG. 5 is an exemplary illustration of power saving groups, according to certain embodiments.

FIG. 5 is an exemplary illustration of power saving groups (e.g., group 1, group 2, group 3, and group 4), according to certain embodiments. Each of the power saving groups (e.g., group 1, group 2, group 3, and group 4) includes one or more low power state entrance actions (e.g., A-K), where the controller 108 may determine one of power saving groups (e.g., group 1, group 2, group 3, or group 4) to perform when entering the low power state. Each of the power saving groups (e.g., group 1, group 2, group 3, and group 4) may include at least one common low power state entrance action, such that the at least one common low power state entrance action may be a required action. Furthermore, each of the low power state entrance actions (e.g., A-K) is associated with a circle, where, for exemplary purposes, an area of the circle is proportional to an amount of power saved upon completing the respective low power state entrance action. It is to be understood that the number of low power state entrance actions and the area of the circles of each low power state entrance actions are not intended to be limiting, but to provide an example of a possible embodiment.

For example, low power state entrance action A may include turning off part of the device NAND power, low power state entrance action B may include lowering clock frequency, low power state entrance action C may include turning off some clock entirely, low power state entrance action D may include turning off local oscillator, low power state entrance action E may include copying data from volatile range to a non-volatile range and turning off the volatile memories, low power state entrance action F may include shutting off about 50% of the CPUs, low power state entrance action G may include shutting off PLLs, low power state entrance action H may include lowering the device operating voltage, low power state entrance action I may include stopping some peripheral circuitry, low power state entrance action J may include powering down other parts of the circuitry, and low power state entrance action K may include turning off analog circuitry power. It is to be understood that the term "about" above may refer to plus or minus 5%.

Group 1 includes low power state entrance actions A-K. Group 2 includes low power state entrance actions A-C, G, and H. Group 3 includes low power state entrance actions A-C and K. Group 4 includes low power state entrance actions D, E, G, and K. Group 1 includes all of the low power state entrance actions and groups 2-4 includes less than all of the low power state entrance actions. Furthermore, groups 2-4 may include at least one common low power state entrance action and/or at least one different low power state entrance action.

Group 1 may be associated with a completion wake up time of about 100 usec. A completion wake up time is the amount of time needed to restore a data storage device, such as the data storage device 106 of FIG. 1, from a low power state (e.g., L1.2) to an operational power state (e.g., L0, L0s, or L1). Group 2 may be associated with a completion wake up time of about 50 usec. Group 3 may be associated with a completion wake up time of about 10 usec. Group 4 may be associated with a completion wake up time of about 1 usec. It is to be understood that the previously listed times are not intended to be limiting but to provide an example of a possible embodiment. In terms of amount of power saved from performing the low power state entrance actions of the group, group 1 has the most amount of power saved, group 2 has the second most amount of power saved, group 3 has the third most amount of power saved, and group 4 has the least amount of power saved. The amount of power saved may be proportional to the completion wake up time. In other words, the greater the exit latency from the low power state, the more amount of power saved.

Based on the host exit latency, such as the host exit latency determined at block 418 of method 400 of FIG. 4, a controller, such as the controller 108, may determine which of the power saving groups to perform during a next low power state entrance operation. For example, if the host exit latency is 60 usec, then the controller 108 may choose to perform group 2 actions during a next low power state entrance operation. The controller 108 may choose a group of the power saving groups by comparing each completion wake up time to the host exit latency and choosing a group whose completion wake up time is less than or equal to the host exit latency. The group chosen may be one that is closest to the host exit latency. In examples, where all of the completion wake up times are greater than the host exit latency, the controller 108 may choose a group whose completion wake up time is nearest to the host exit latency. In other words, the wake up operation is more optimized when the completion wake up time is closest to the host exit latency. In some examples, the controller 108 may select a number of actions to perform out of all possible low power state entrance actions to perform based on the host exit latency and the completion wake up time of the selected number of actions to perform.

Figure 6:
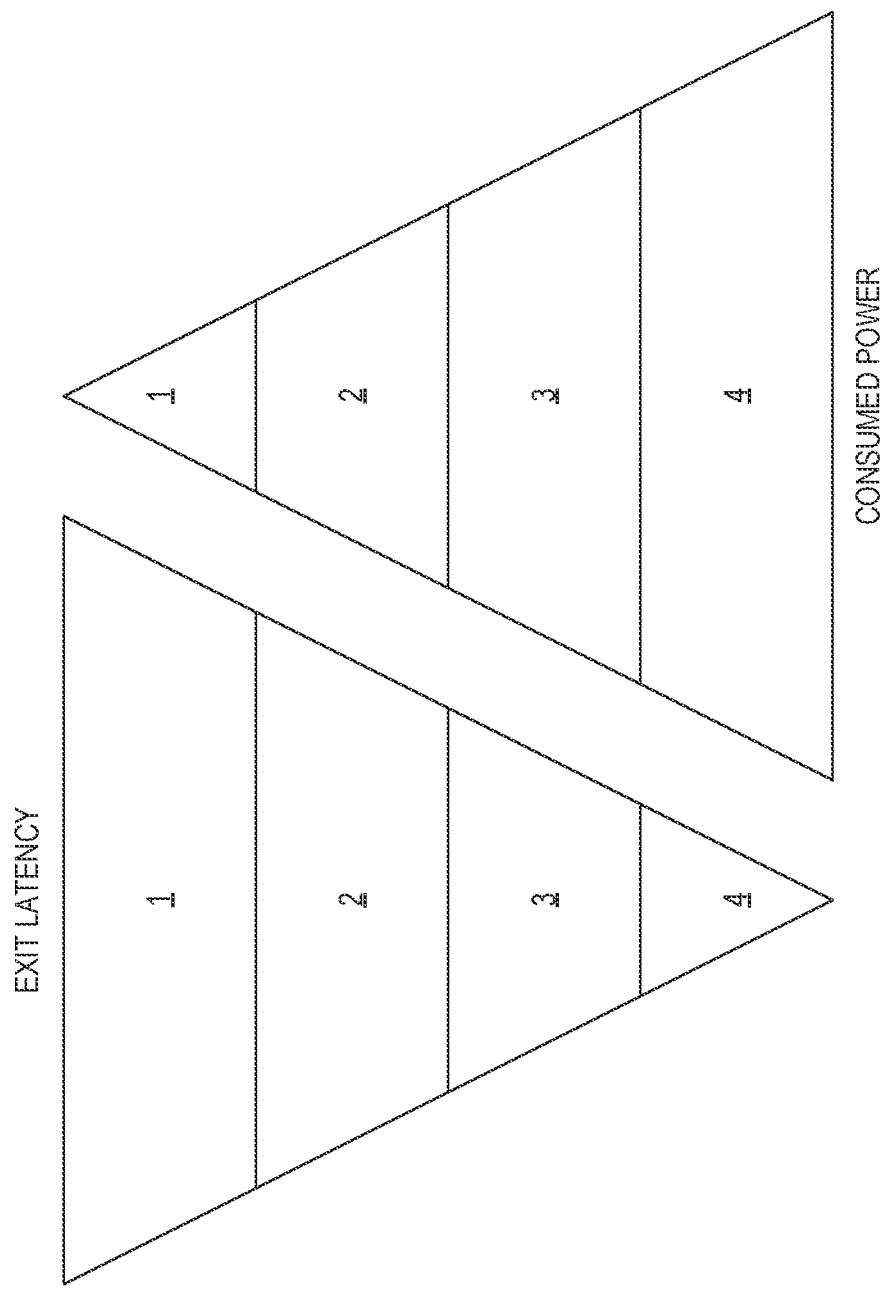
FIG. 6 is an exemplary illustration showing exit latency vs power consumption, according to certain embodiments.

FIG. 6 is an exemplary illustration showing exit latency vs power consumption, according to certain embodiments. Aspects of the storage system 100 of FIG. 1 may be referenced herein for exemplary purposes. Each numeral shown (e.g., 1, 2, 3, and 4) may refer to a respective group of the power saving groups (e.g., group 1, group 2, group 3, and group 4) of FIG. 5. As shown in FIG. 6, the amount of consumed power during a low power state of the data storage device 106 is inversely proportional to the exit latency to exit the low power state. For example, group 1 has the largest exit latency from the low power state and the lowest amount of consumed power during the low power state and group 4 has the lowest exit latency from the low power state and the highest amount of consumed power during the low power state. For exemplary purposes, Table 1 below describes various power saving options.

TABLE 1

| # | Description | Power Saved | Time to Initiate Exit | Time to Complete Exit | Dependencies |
|---|---|---|---|---|---|
| 1 | Power down a hardware module while retaining memories | 3 mW | 100 nsec | 1 μsec | #3 completed |
| 2 | Power down a hardware module without retaining memories | 3.5 mW | 400 nsec | 1.2 μsec | #3 completed |
| 3 | Turn off clocks | 5 mW | 80 nsec | 200 nsec | #4 completed |
| 4 | Turn off PLL | 4 mW | 100 nsec | 600 nsec | |

Figure 7:
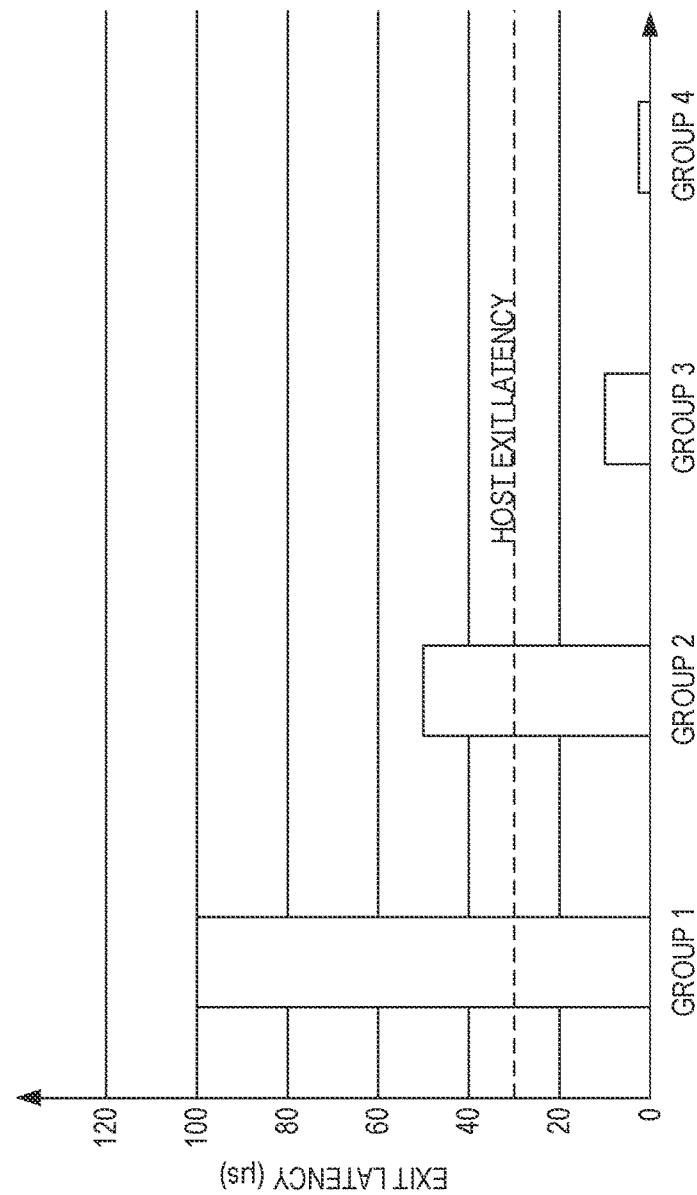
FIG. 7 is an exemplary graph of selecting a group of low power state actions based on a host exit latency, according to certain embodiments.

FIG. 7 is an exemplary graph 700 of selecting a group of low power state actions based on a host exit latency, according to certain embodiments. Aspects of the storage system 100 of FIG. 1 may be referenced herein for exemplary purposes. Each group (i.e., group 1, group 2, group 3, and group 4) may be a respective group described in FIG. 5 and FIG. 6. For example, group 1 of FIG. 7 may be group 1 of FIG. 5 and group 1 of FIG. 6. As shown in the exemplary graph 700, group 1 has an exit latency (i.e., completion wake up time) of 100 μsec, group 2 has an exit latency of 50 μsec, group 3 has an exit latency of 10 μsec, and group 4 has an exit latency of 1 μsec. The host exit latency is shown to be 30 μsec. Thus, out of the 4 groups, the controller 108 may determine to perform group 3 low power state entrance actions or group 4 low power state entrance actions. Because the exit latency of group 3 is closest to the host exit latency, the controller 108 selects the low power state entrance actions of group 3 to perform during a next low power state entrance operation.

Figure 8:
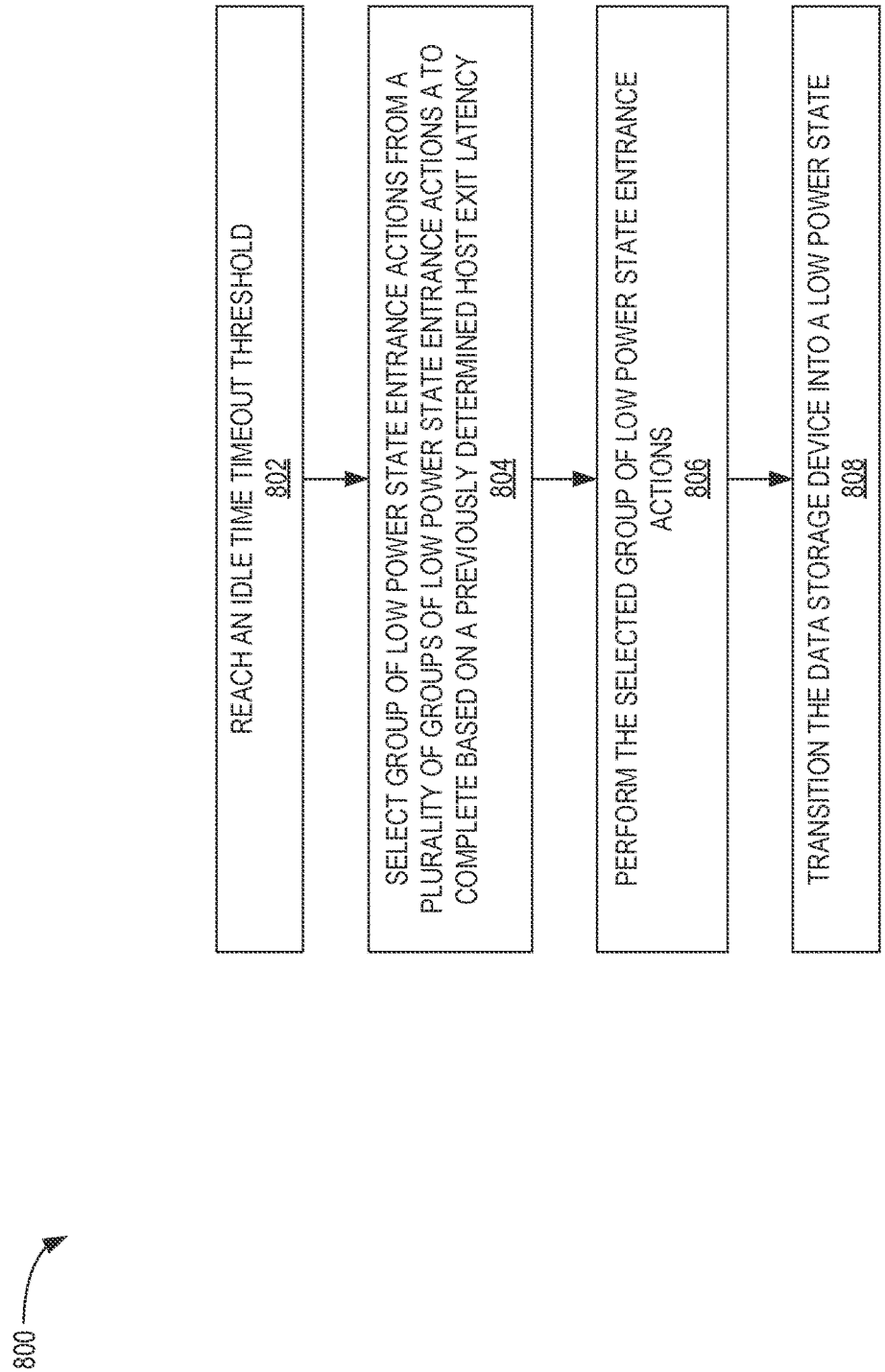
FIG. 8 is a flow diagram illustrating a method of selecting a group of low power state actions based on a host exit latency, according to certain embodiments.

FIG. 8 is a flow diagram illustrating a method 800 of selecting a group of low power state actions based on a host exit latency, according to certain embodiments. Method 800 may be implemented by a controller, such as the controller 108 of FIG. 1. For exemplary purposes, aspects of the storage system 100 of FIG. 1 may be referenced herein.

At block 802, an idle time timeout threshold is reached. At block 804, the controller selects a group of low power state entrance actions from a plurality of groups of low power state entrance actions (e.g., group 1, group 2, group 3, or group 4 of FIG. 5, FIG. 6, and FIG. 7) to complete based on a previously determined host exit latency for the host device/data storage device/connection pairing. It is to be understood that each group of the plurality of groups of low power state entrance actions may be fine-tuned. The fine-tuning is based on one or more of a number of NVMe submission queues and/or completion queues, a number of un-updated logical-to-physical (L2P) entries, a current state of the data storage device 106 (i.e., link state or power state), and the like. For example, the fine-tuning may utilize an equation such as: (completion_wake_up_time)= (group_#_base_time)+(state_table*n), where "n" refers to a predetermined tuning variable. The fine-tuning may be based on a setup time or configuration time of the data storage device from the low power state. It is to be understood that the setup time or configuration time of the data storage device may include initialization aspects other than the abovementioned examples. At block 806, the controller performs the selected group of low power state entrance actions. At block 808, the controller 108 transitions the data storage device into the low power state.

Figure 9:
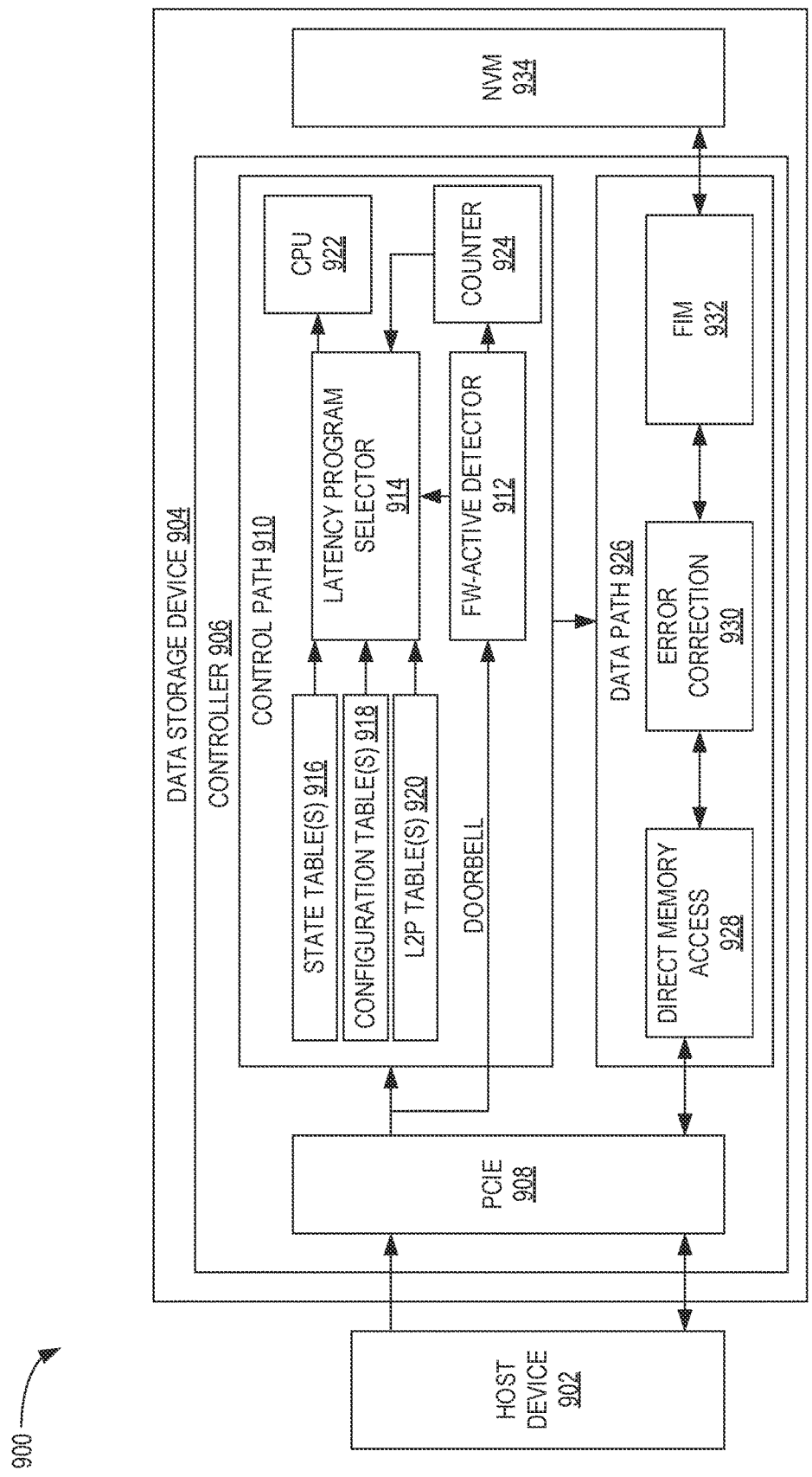
FIG. 9 is a schematic block diagram illustrating a storage system in which a data storage device may function as a storage device for a host device, according to certain embodiments.

FIG. 9 is a schematic block diagram illustrating a storage system 900 in which a data storage device 904 may function as a storage device for a host device 902, according to certain embodiments. Furthermore, controller 906 may be used to implement method 300 of FIG. 3, method 400 of FIG. 4, and method 800 of FIG. 8. It is to be understood that embodiments described above may utilize aspects of the storage system 900, such as controller 906, counter 924, and the like. Likewise, aspects of the storage system 900 may be similar to the storage system 100 of FIG. 1.

The data storage device 904 includes the controller 906 and the NVM 934. The controller 906 includes a PCIe 908, a control path 910, and a data path 926. When a command is received at the PCIe 908, the command is transferred to the control path 910. If the command includes data, then the data is transferred to the data path 926. The control path 910 includes a FW-active detector 912, a latency program selector 914, one or more state tables 916, one or more configuration tables 918, one or more L2P tables 920, a central processing unit (CPU) 922, and a counter 924. The FW-active detector 912 may receive a doorbell sent by the host device 902 to wake up the data storage device 904 from a low power state, such as the L1.2 link state. The counter 924 is used to determine when to transition the data storage device into the low power state as well as to determine the host exit latency. The counter 924 provides the host exit latency to the latency program selector 914, where the latency program selector 914 determines which group of low power state entrance actions from a plurality of groups of low power state entrance actions to complete during a next low power state entrance operation. For example, the latency program selector 914 may fine-tune a completion wake up time associated with each of the groups based on one or more of the one or more state tables 916, the one or more configuration tables 918, and the one or more L2P tables 920. The one or more state tables 916, one or more configuration tables 918, and one or more L2P tables 920 may be a portion of a setup time or configuration time of the data storage device from the low power state. It is to be understood that the setup time or configuration time of the data storage device may include other setup tables or configuration tables other than the one or more state tables 916, one or more configuration tables 918, and one or more L2P tables 920.

When processing the command, the control path 910 passes instructions, generated by the CPU 922, to the data path 926. If data was received by the controller 906 from the host device, then the data is passed from the direct memory access (DMA) 928 to the error correction module 930 to be encoded and from the error correction module 930 to the flash interface module (FIM) 932. The data is programmed to the NVM 934 from the FIM 932. Likewise, if the command received is a read command, the data is read from the NVM 934 and transferred to the FIM 932, from the FIM 932 to the error correction module 930 to be decoded, and from the error correction module 930 to the DMA 928. The data is then transferred through the PCIe 908 to the host device 902.

By performing a number of low power state entrance actions that have a total wakeup time less than a host exit latency, power saving during FW active idle without increasing wakeup latency may be optimized.

In one embodiment, a data storage device includes a memory device and a controller coupled to the memory device. The controller is configured to receive a wake up indication from a host device, where the data storage device is in a low power state, receive a doorbell from the host device indicating that a new command is in a submission queue of the host device, determine a host exit latency, where the host exit latency is a time between the wake up indication and the doorbell, and utilize the host exit latency to select a group of actions from a plurality of group of actions based on the determining, where each of the plurality of group of actions comprises a different amount of low power state entrance actions to complete during a next low power state entrance.

The different amount of low power state entrance actions is a configurable number of low power state entrance actions. At least one of the low power state entrance actions of one or more group of actions of the plurality of group of actions is the same. At least one of the low power state entrance actions of one or more group of actions of the plurality of group of actions is different. Each group of the plurality of group of actions is associated with a completion wake up time. The completion wake up time corresponds to a time to restore the data storage device from a low power state to a normal operating power state. The controller is further configured to, when utilizing the host exit latency to select the group of actions from the plurality of group of actions, determine that there is at least one completion wake up time that is less than or equal to the host exit latency. The controller is further configured to select the group of actions that has the completion wake up time that is closest to the host exit latency when there is at least one completion wake up time that is less than or equal to the host exit latency. The controller is further configured to select the group of actions that has the completion wake up time that is closest to the host exit latency upon determining that all of the completion wake up times are greater than the host exit latency. The completion wake up time is dependent on the low power state entrance actions of the group of actions selected and a setup time of the data storage device. The controller is further configured to perform the low power state entrance actions of the group of actions selected upon determining that an idle time timeout threshold has been reached and transition the data storage device to the low power state.

In another embodiment, a data storage device includes a memory device and a controller coupled to the memory device. The controller includes a firmware-active detector and a latency program selector coupled to the firmware-active detector. The firmware-active detector is configured to determine a host exit latency, where the host exit latency is a time between receiving a wake up indication from a host device and receiving a doorbell subsequent to receiving the wake up indication from the host device. The latency program selector is configured to select a group of actions from a plurality of group of actions based on the determining, where each of the plurality of group of actions comprises a different amount of low power state entrance actions to complete during a next low power state entrance.

The firmware active detector is further configured to initiate a counter responsive to receiving the wake up indication from the host device and stop the counter responsive to receiving the doorbell from the host device, where the time is determined based on the counter. The data storage device is in a low power state during the determining. A first group of actions of the plurality of group of actions comprises all of the low power state entrance actions. Each group of actions other than the first group of actions of the plurality of group of actions comprises less than all of the low power state entrance actions. A number of the low power state entrance actions of each group of actions other than the first group of actions is different from each other. The group of actions selected has a completion wake up time less than the host exit latency. The completion wake up time is calculated based on a time to complete a restoration from each of the low power state entrance actions of the group of actions. The completion wake up time is further calculated based on a fine-tuning parameter. The fine-tuning parameter is dependent on a setup time of the data storage device.

In another embodiment, a data storage device includes a means for storing data and a controller coupled to the means for storing data. The controller is configured to determine that an idle time timeout threshold has been reached, perform a number of low power state entrance actions based on a previously determined host exit latency, where a completion wake up time to complete a restoration from the number of low power state entrance actions is less than the previously determined host exit latency, and transition the data storage device into a low power mode. The number of low power state actions is dynamic.

While the foregoing is directed to embodiments of the present disclosure, other and further embodiments of the disclosure may be devised without departing from the basic scope thereof, and the scope thereof is determined by the claims that follow.

What is claimed is:

1. A data storage device, comprising:
a memory device; and
a controller coupled to the memory device, wherein the controller is configured to:
receive a wake up indication from a host device, wherein the data storage device is in a low power state;
receive a doorbell from the host device indicating that a new command is in a submission queue of the host device;
determine a host exit latency, wherein the host exit latency is a time between the wake up indication and the doorbell; and
utilize the host exit latency to select a group of actions from a plurality of group of actions based on the determining, wherein each of the plurality of group of actions comprises a different amount of low power state entrance actions to complete during a next low power state entrance.

2. The data storage device of claim 1, wherein the different amount of low power state entrance actions is a configurable number of low power state entrance actions.

3. The data storage device of claim 1, wherein at least one of the low power state entrance actions of one or more group of actions of the plurality of group of actions is the same.

4. The data storage device of claim 1, wherein at least one of the low power state entrance actions of one or more group of actions of the plurality of group of actions is different.

5. The data storage device of claim 1, wherein each group of the plurality of group of actions is associated with a completion wake up time, and wherein the completion wake up time corresponds to a time to restore the data storage device from a low power state to a normal operating power state.

6. The data storage device of claim 5, wherein the controller is further configured to, when utilizing the host exit latency to select the group of actions from the plurality of group of actions, determine that there is at least one completion wake up time that is less than or equal to the host exit latency.

7. The data storage device of claim 6, wherein the controller is further configured to select the group of actions that has the completion wake up time that is closest to the host exit latency when there is at least one completion wake up time that is less than or equal to the host exit latency.

8. The data storage device of claim 6, wherein the controller is further configured to select the group of actions that has the completion wake up time that is closest to the host exit latency upon determining that all of the completion wake up times are greater than the host exit latency.

9. The data storage device of claim 5, wherein the completion wake up time is dependent on the low power state entrance actions of the group of actions selected and a setup time of the data storage device.

10. The data storage device of claim 1, wherein the controller is further configured to:
perform the low power state entrance actions of the group of actions selected upon determining that an idle time timeout threshold has been reached; and
transition the data storage device to the low power state.

11. A data storage device, comprising:
a memory device; and
a controller coupled to the memory device, wherein the controller is configured to:
determine a host exit latency, wherein the host exit latency is a time between receiving a wake up indication from a host device and receiving a doorbell subsequent to receiving the wake up indication from the host device; and
select a group of actions from a plurality of group of actions based on the determining, wherein each of the plurality of group of actions comprises a different amount of low power state entrance actions to complete during a next low power state entrance.

12. The data storage device of claim 11, wherein the controller is further configured to:
initiate a counter responsive to receiving the wake up indication from the host device; and
stop the counter responsive to receiving the doorbell from the host device, wherein the time is determined based on the counter.

13. The data storage device of claim 11, wherein the data storage device is in a low power state during the determining.

14. The data storage device of claim 11, wherein a first group of actions of the plurality of group of actions comprises all of the low power state entrance actions.

15. The data storage device of claim 14, wherein each group of actions other than the first group of actions of the plurality of group of actions comprises less than all of the low power state entrance actions.

16. The data storage device of claim 15, wherein a number of low power state entrance actions of each group of actions other than the first group of actions is different from each other.

17. The data storage device of claim 16, wherein the group of actions selected has a completion wake up time less than the host exit latency, and wherein the completion wake up time is calculated based on a time to complete a restoration from each of the low power state entrance actions of the group of actions.

18. The data storage device of claim 17, wherein the completion wake up time is further calculated based on a fine-tuning parameter, and wherein the fine-tuning parameter is dependent on a setup time of the data storage device.

19. A data storage device, comprising:
    means for storing data; and
    a controller coupled to the means for storing data, wherein the controller is configured to:
        determine that an idle time timeout threshold has been reached;
        perform a number of low power state entrance actions based on a previously determined host exit latency, wherein a completion wake up time to complete a restoration from the number of low power state entrance actions is less than the previously determined host exit latency; and
        transition the data storage device into a low power mode.

20. The data storage device of claim 19, wherein the number of low power state entrance actions is dynamic.

* * * * *